US 9,397,893 B2

(12) United States Patent
Dunne et al.

(10) Patent No.: US 9,397,893 B2
(45) Date of Patent: Jul. 19, 2016

(54) MANAGING QUALITY OF EXPERIENCE FOR MEDIA TRANSMISSIONS

(71) Applicant: International Business Machines Corporation, Armonk, NY (US)

(72) Inventors: Jonathan Dunne, Dungarvan (IE); Paul B. French, Cork (IE); James P. Galvin, Jr., Georgetown, KY (US); Yi Han, Terenure (IE); Patrick J. O'Sullivan, Ballsbridge (IE)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 14/066,806

(22) Filed: Oct. 30, 2013

(65) Prior Publication Data
US 2015/0120877 A1    Apr. 30, 2015

(51) Int. Cl.
*H04L 12/24*    (2006.01)
*H04L 29/06*    (2006.01)

(52) U.S. Cl.
CPC ........ *H04L 41/0896* (2013.01); *H04L 41/5009* (2013.01); *H04L 41/509* (2013.01); *H04L 41/5025* (2013.01); *H04L 65/80* (2013.01)

(58) Field of Classification Search
CPC . H04L 41/0896; H04L 41/5025; H04L 65/80; H04L 41/509; H04L 41/5009
USPC ................................................ 709/219, 223
See application file for complete search history.

(56) References Cited

U.S. PATENT DOCUMENTS

| | | | |
|---|---|---|---|
| 6,947,750 B2 * | 9/2005 | Kakani | H04L 12/5695 370/230 |
| 7,406,078 B2 | 7/2008 | Jeon | |
| 7,817,554 B2 | 10/2010 | Skog et al. | |
| 2003/0202476 A1 * | 10/2003 | Billhartz | H04L 12/5695 370/236 |
| 2010/0198946 A1 * | 8/2010 | Dowlatkhah | H04L 65/80 709/220 |
| 2011/0010899 A1 * | 1/2011 | Kozato | A44B 19/06 24/409 |
| 2011/0306035 A1 * | 12/2011 | Arad | C12Q 1/34 435/5 |
| 2012/0140935 A1 * | 6/2012 | Kruglick | H04L 65/1083 381/56 |
| 2012/0278441 A1 * | 11/2012 | Li | H04L 65/607 709/219 |
| 2012/0314593 A1 | 12/2012 | Liu | |

(Continued)

FOREIGN PATENT DOCUMENTS

CN        1650573 A     8/2005

*Primary Examiner* — Brian J Gillis
*Assistant Examiner* — Steve Lin
(74) *Attorney, Agent, or Firm* — Brian J. Colandreo, Esq.; Jeffrey T. Placker, Esq.; Holland & Knight LLP

(57) ABSTRACT

A computer-implemented method, computer program product, and computing system is provided for quality of experience for media transmissions. In an implementation, a method may include determining a first quality of experience metric associated with a media stream at a first network node. The first quality of experience metric may be transmitted with the media stream. The method may also include determining a second quality of experience metric associated with the media stream at a second network node. An updated quality of experience metric may be transmitted with the media stream. The updated quality of experience metric may be based upon, at least in part, the first quality of experience metric and the second quality of experience metric.

11 Claims, 6 Drawing Sheets

(56) References Cited

U.S. PATENT DOCUMENTS

| | | | | |
|---|---|---|---|---|
| 2013/0268577 A1* | 10/2013 | Oyman | | H04N 13/00 709/203 |
| 2013/0301415 A1* | 11/2013 | Archer | | H04W 28/08 370/235 |
| 2014/0019593 A1* | 1/2014 | Reznik | | H04L 65/60 709/219 |
| 2014/0033242 A1* | 1/2014 | Rao | | H04N 21/442 725/14 |
| 2014/0153419 A1* | 6/2014 | Beattie, Jr. | | H04W 24/10 370/252 |
| 2014/0317234 A1* | 10/2014 | Mueller | | H04L 47/10 709/217 |
| 2014/0328186 A1* | 11/2014 | Garcia | | H04L 12/2801 370/241 |

* cited by examiner

MANAGING QUALITY OF EXPERIENCE FOR MEDIA TRANSMISSIONS

TECHNICAL FIELD

The present disclosure generally relates to systems and method for transmitting media, and more particularly relates to managing quality of experience for media transmissions.

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites, social networks, and topical blogs. The Internet may further be used to distribute content to users. For example, video content may be simultaneously multicast to a plurality of users in a fashion similar to the way that cable television networks transmit content to end users.

SUMMARY OF DISCLOSURE

According to an implementation, a computer-implemented method may include determining, by a computing device, a first quality of experience metric associated with a media stream at a first network node. The first quality of experience metric may be transmitted with the media stream. The method may also include determining a second quality of experience metric associated with the media stream at a second network node. An updated quality of experience metric may be transmitted with the media stream. The updated quality of experience metric may be based upon, at least in part, the first quality of experience metric and the second quality of experience metric.

One or more of the following features may be included. The quality of experience metric may be based upon, at least in part, network conditions experienced by the media stream associated with the first network node.

The method may further include determining that one of the first quality of experience metric and the second quality of experience metric is associated with an unsatisfactory quality of experience for the media stream. A remedial action may be implemented with respect to the media stream. The remedial action may include reducing a bandwidth requirement of the media. The remedial action may include transmitting redundant media stream data. Implementing the remedial action may include implementing the remedial action via a specific node associated with the unsatisfactory quality of experience for the media stream. The method may further include determining that a satisfactory quality of experience for the media stream has been restored. The remedial action may be discontinued.

According to another implementation, a computer program product includes a computer readable storage medium having a plurality of instructions stored on it. When executed by a processor, the instructions may cause the processor to perform operations including determining a first quality of experience metric associated with a media stream at a first network node. The first quality of experience metric may be transmitted with the media stream. Instructions may be included for determining a second quality of experience metric associated with the media stream at a second network node. An updated quality of experience metric may be transmitted with the media stream. The updated quality of experience metric may be based upon, at least in part, the first quality of experience metric and the second quality of experience metric.

One or more of the following features may be included. The quality of experience metric may be based upon, at least in part, network conditions experienced by the media stream associated with the first network node.

Instructions may be included for determining that one of the first quality of experience metric and the second quality of experience metric is associated with an unsatisfactory quality of experience for the media stream. A remedial action may be implemented with respect to the media stream. The remedial action may include reducing a bandwidth requirement of the media. The remedial action may include transmitting redundant media stream data. Implementing the remedial action may include implementing the remedial action via a specific node associated with the unsatisfactory quality of experience for the media stream. Instructions may be included for determining that a satisfactory quality of experience for the media stream has been restored. The remedial action may be discontinued.

According to yet another implementation, a computing system may include a processor and a memory architecture coupled with the processor. The processor may be configured for determining a first quality of experience metric associated with a media stream at a first network node. The first quality of experience metric may be transmitted with the media stream. The processor may also be configured for determining a second quality of experience metric associated with the media stream at a second network node. An updated quality of experience metric may be transmitted with the media stream. The updated quality of experience metric may be based upon, at least in part, the first quality of experience metric and the second quality of experience metric.

One or more of the following features may be included. The quality of experience metric may be based upon, at least in part, network conditions experienced by the media stream associated with the first network node.

The processor may be further configured for determining that one of the first quality of experience metric and the second quality of experience metric is associated with an unsatisfactory quality of experience for the media stream. A remedial action may be implemented with respect to the media stream. The remedial action may include reducing a bandwidth requirement of the media. The remedial action may include transmitting redundant media stream data. Implementing the remedial action may include implementing the remedial action via a specific node associated with the unsatisfactory quality of experience for the media stream.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
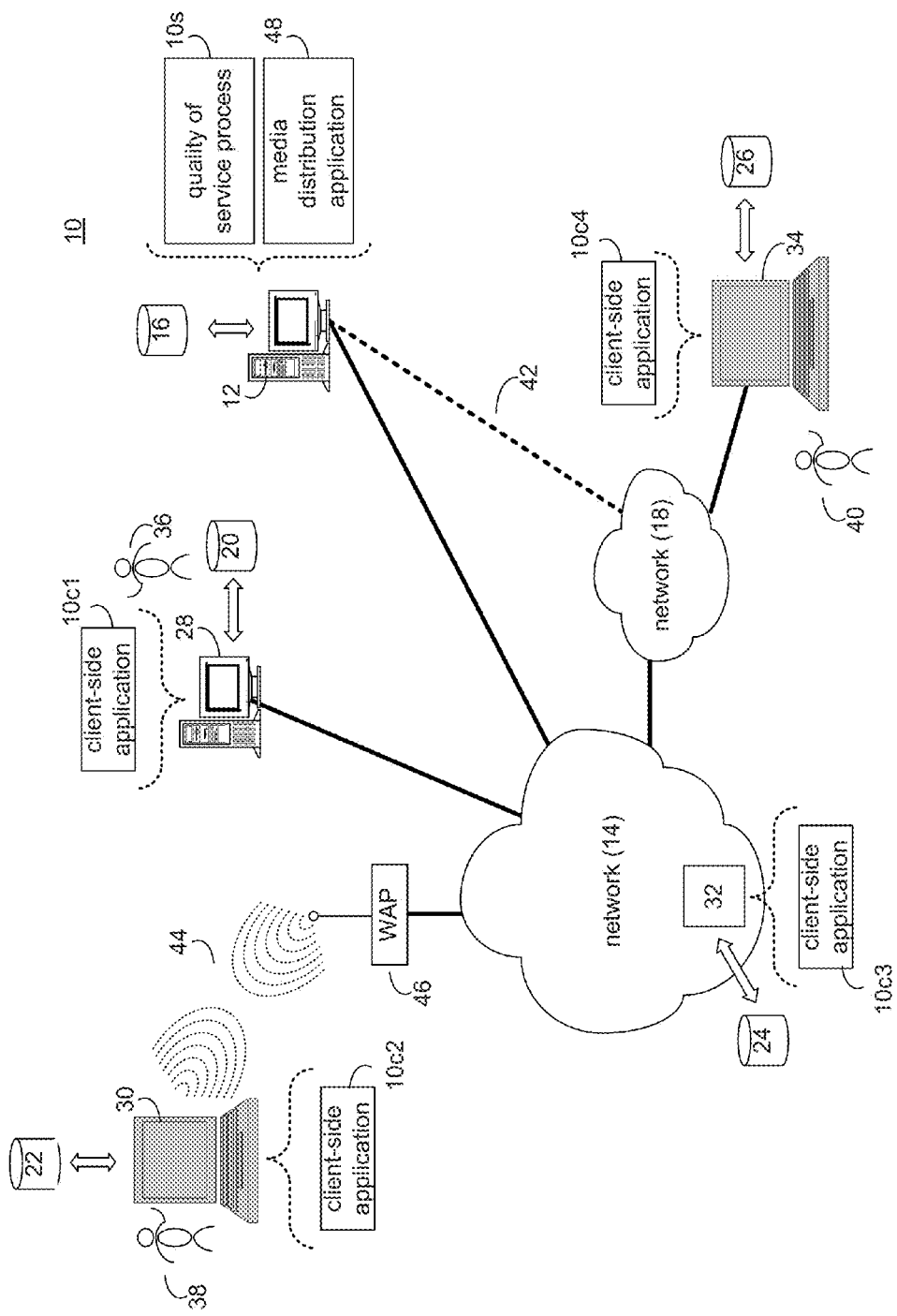
FIG. 1 is a diagrammatic view of a distributed computing network including a computing device that executes a quality of experience process according to an implementation of the present disclosure.

Media distribution over data networks, such as local area networks, wide area networks, the Internet, and the like, have greatly increased the ease with which media content, such as video content, can be shared between users and distributed or broadcast to end consumers of the media content. For example, video media content such as movies, television content, as well as other video content, may be easily distributed to viewers over the Internet or other data networks utilizing a variety of media streaming or distribution systems, such as webTV, IPTV (i.e., internet protocol TV), as well as various other media distribution systems. While the quality of experience of the end consumer of distributed media, such as streaming video or the like, is a consideration for media distribution systems, the quality of experience of the end consumer may be particularly important for paid services (e.g., whether paid via end consumer subscriptions or the like, or through advertising associated with the distributed media). While the description herein may generally relate to video media, it will be appreciated that the features and aspects described herein may, in many embodiments, be equally applicable to other media types, including, but not limited to, audio media.

While the quality of the video leaving the source of the video content (e.g., video head-end) for the video distribution system may often be of sufficient quality to achieve a desired end consumer quality of experience, the quality of experience realized by the end user may, in some instances, be significantly degraded. For example, as the video travels through the network the quality of the video may be degraded, e.g., as a result of lost packets, delay, jitter, etc. As such, the quality of the video arriving at an end point (e.g., such as client computing device, or other playback or consumption device) may be reduced to a degree that the quality of experience of the consumer, or end user, of the streaming video system may be impaired. In some embodiments, basic internet protocol (e.g., "IP") metrics such as jitter, delay, and packet loss can be monitored along the network path between the source of the video content and the end-user device (e.g., end-point), as well as any point in between, may be monitored. A quality of experience metric may be determined for the video stream along the network path, which may represent a real-time (e.g., which herein may include real-time and/or near real-time) measure of the quality of experience for the video stream, and/or may represent, in real-time, how the network conditions may impact the quality of experience for the video stream.

According to an embodiment, methods and systems may be provided for monitoring quality of experience associated with streaming media content (such as streaming video), and for transmitting a quality of experience metric along with the media stream. For example, network nodes supporting the transport of the media stream through the network, e.g., between the media distribution server and an end point, may monitor and determine quality of experience metrics for the media stream in real-time, and may transmit the quality of experience metrics that are intrinsic to the media stream along with the media stream through the network. As such, the quality of experience metrics and remedial action logic stream may be transmitted in real-time along the same transmission pipe as the media stream. In one implementation, once the media stream passes through a node in the network, the quality of experience metrics of the media stream may be logged, and the quality of experience metrics may be forwarded ahead to the next node in the transmission. In such an embodiment, because the media stream and the quality of experience metrics are transmitted in real-time in parallel, no external analysis of the media stream may be required to identify quality of experience issues associated with the media stream. Furthermore, the quality of experience metrics for the media stream may provide an awareness of the location of each node and of the upstream and downstream network conditions associated with the transmission path of the media stream.

Referring to FIG. 1, there is shown quality of experience process 10. For the following discussion, it is intended to be understood that quality of experience process 10 may be implemented in a variety of ways. For example, quality of experience process 10 may be implemented as a server-side process, a client-side process, or a server-side/client-side process.

For example, quality of experience process 10 may be implemented as a purely server-side process via quality of experience process 10s. Alternatively, quality of experience process 10 may be implemented as a purely client-side process via one or more of client-side application 10c1, client-side application 10c2, client-side application 10c3, and client-side application 10c4. Alternatively still, quality of experience process 10 may be implemented as a server-side/client-side process via server-side quality of experience process 10s in combination with one or more of client-side application 10c1, client-side application 10c2, client-side application 10c3, and client-side application 10c4. In such an example, at least a portion of the functionality of quality of experience process 10 may be performed by quality of experience process 10s and at least a portion of the functionality of quality of experience process 10 may be performed by one or more of client-side application 10c1, 10c2, 10c3, and 10c4.

Accordingly, quality of experience process 10 as used in this disclosure may include any combination of quality of experience process 10s, client-side application 10c1, client-side application 10c2, client-side application 10c3, and client-side application 10c4.

Figure 2:
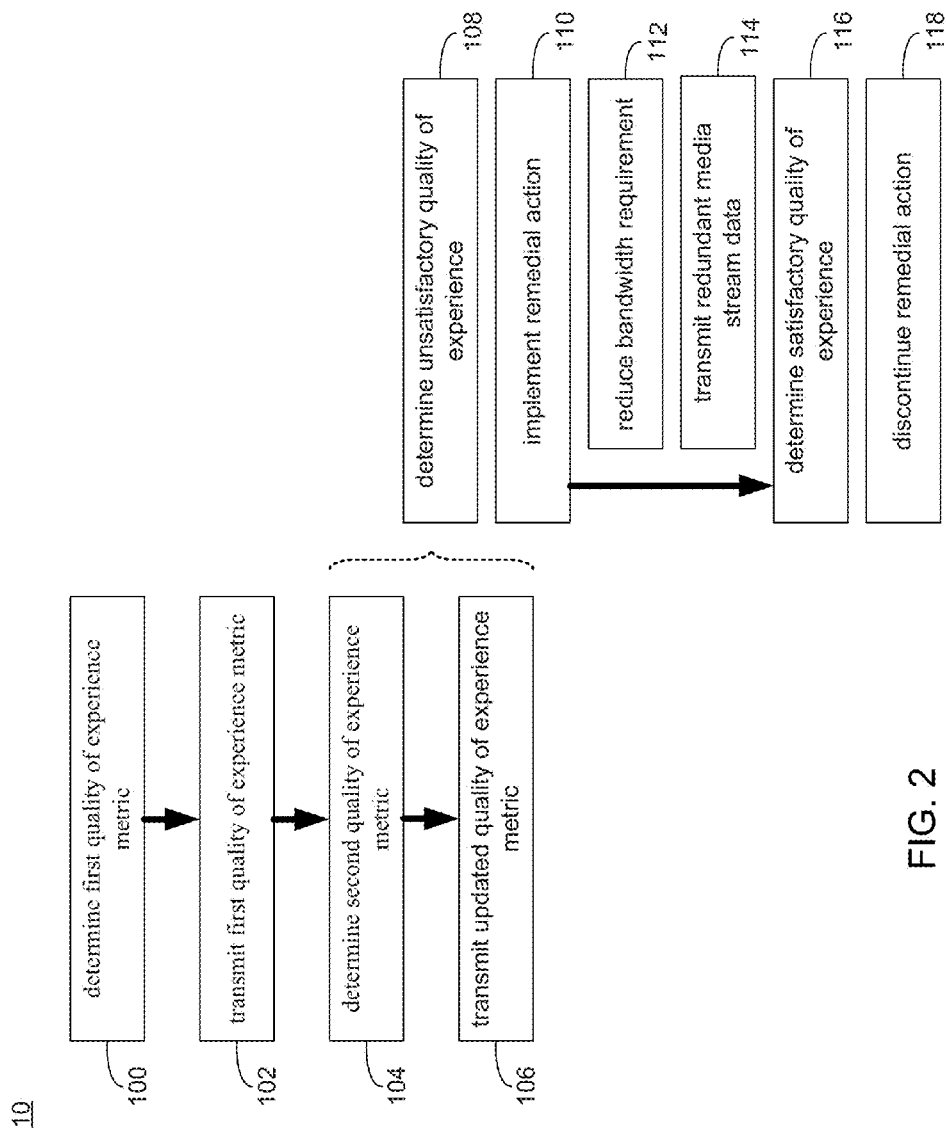
FIG. 2 is a flowchart of the quality of experience process of FIG. 1, according to an implementation of the present disclosure.

Referring also to FIG. 2, and as will be discussed in greater detail below, quality of experience process 10 may determine 100 a first quality of experience metric associated with a media stream at a first network node. Quality of experience process 10 may also transmit 102 the first quality of experience metric with the media stream. Quality of experience process 10 may also determine 104 a second quality of experience metric associated with the media stream at a second network node. Quality of experience process 10 may further transmit 106 an updated quality of experience metric with the media stream. The updated quality of experience metric may be based upon, at least in part, the first quality of experience metric and the second quality of experience metric.

Quality of experience process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of quality of experience process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to, one or more of a media consumption application, a media transport application, a video playback application, a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, network distribution device 32 (such as a router, a switch, etc.), notebook computer 34, a netbook computer (not shown), a server computer (not shown), a gaming console (not shown), a set-top box, a data-enabled television console (not shown), and a dedicated network device (not shown). Client electronic devices 28, 30, 32, 34 may each execute an operating system.

Users 36, 38, 40, may access quality of experience process 10 directly through network 14 or through secondary network 18. Further, quality of experience process 10 may be accessed through secondary network 18 via link line 42.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 46. WAP 46 may be, for example, an IEEE 802.11a, 802.11b, 802.11g, 802.11n, Wi-Fi, and/or Bluetooth device that is capable of establishing wireless communication channel 44 between laptop computer 30 and WAP 46. Network device 32 coupled in network 14 via a hardwired connection or a wireless communication channel. Additionally, personal computer 34 is shown directly coupled to network 18 via a hardwired network connection.

In some embodiments, quality of experience process 10 may communicate with, interact with, and/or include a component or module of a media distribution application, (e.g., media distribution application 48). In an embodiment, media distribution application 48 may be capable of providing internet protocol television (IPTV) services, internet television, streaming video, or otherwise providing media content to client applications (e.g., client applications 10c1, 10c2, 10c3, 10c4) over a packet switched network. In an embodiment, media distribution application 48 may provide multicast media transmissions, unicast media transmissions, and/or combinations of multicast and unicast transmissions (e.g., which may be transmitted via one or more of network 14 and network 18 to client applications for consumption of the media). Accordingly, media distribution application 48 may allow one or more users to consume media, such as IPTV media, streaming video, and/or other media via respective client devices.

In an embodiment, the instruction sets and subroutines of media distribution application 48 may be stored, e.g., on storage device 16 associated with server computer 12, which executes media distribution application 48, and/or another suitable storage device. Further, users (e.g., one or more of users 36, 38, 40) may access media distribution application 48 in order to consume media content. The users may access media distribution application 48 via one or more suitable applications, such as client side applications 10c1-10c4 (e.g., which may include a web browser, a media playback application, or another application) and/or via a different application (not shown). As generally discussed above, a portion and/or all of the functionality of quality of experience process 10 may be provided by one or more of client side applications 10c1-10c4. For example, in some embodiments quality of experience process 10 (and/or client-side functionality of quality of experience process 10) may be included within and/or interactive with client-side applications 10c1-10c4, which may include client side media playback and/or consumption applications, web browsers, or another application. Various additional/alternative configurations may be equally utilized.

As generally discussed above with reference to FIG. 2, quality of experience process 10 determine 100 a first quality of experience metric associated with a media stream at a first network node. Quality of experience process 10 may also transmit 102 the first quality of experience metric with the media stream. Quality of experience process 10 may also determine 104 a second quality of experience metric associated with the media stream at a second network node. Quality of experience process 10 may further transmit 106 an updated quality of experience metric with the media stream. The updated quality of experience metric may be based upon, at least in part, the first quality of experience metric and the second quality of experience metric.

For example, and as generally discussed above, in some embodiments quality of experience process 10 may allow a quality of experience associated with streaming media, such as streaming video, to be monitored by one or more network traffic distribution nodes that the streaming video passes through between a media distribution server and an end point (such as a consumer of the streaming video). Further, in some embodiments, quality of experience process 10 may allow a quality of experience metric associated with streaming video an one or more respective nodes to be determined. The quality of experience metric may be forwarded along with the streaming video, and may be updated by one or more additional nodes along the path of the streaming video through the network between the media distribution server and an end point. For example, quality of experience process 10 may utilize quality of experience metric associated with the video steam as an indicator of network conditions along the path of the streaming video and/or of a likely quality of experience associated with the streaming video (e.g., which may be based upon, at least in part, the network conditions along the path of the streaming video).

The media stream may include any streaming media, such as video, audio, etc., however for the purpose of illustration, the media stream may be discussed as being a video stream. For example, and referring also to FIG. 3, a video stream (e.g., video stream 150, generally) may be transmitted through a network between a video source (e.g., server 12 that may execute video distribution application 48) and an end user media consumption device, or end point (e.g., client electronic device 28). For example, server computer 12 may be coupled to client electronic device 28 by way of one or more traffic distribution nodes (e.g., node a, node b, node c, node d, node e, one or more of which may include network distribution device 32 executing client application 10c3, and/or another device capable of implementing at least a portion of the functionality of quality of experience process 10). The various nodes may forward the data packets of video stream 150 from video source to the end point. In some embodiments, at least a portion of the functionality of quality of experience process 10 may be implemented by one or more nodes along the network path (e.g., via client application 10c3 executed on network distribution device 32. In some embodiments, at least a portion of the functionality of quality of experience process 10 may be managed, e.g., by centrally deployed quality of experience process 10 (e.g., via quality of experience process 10s deployed on server 12, or otherwise deployed)

Figure 3:
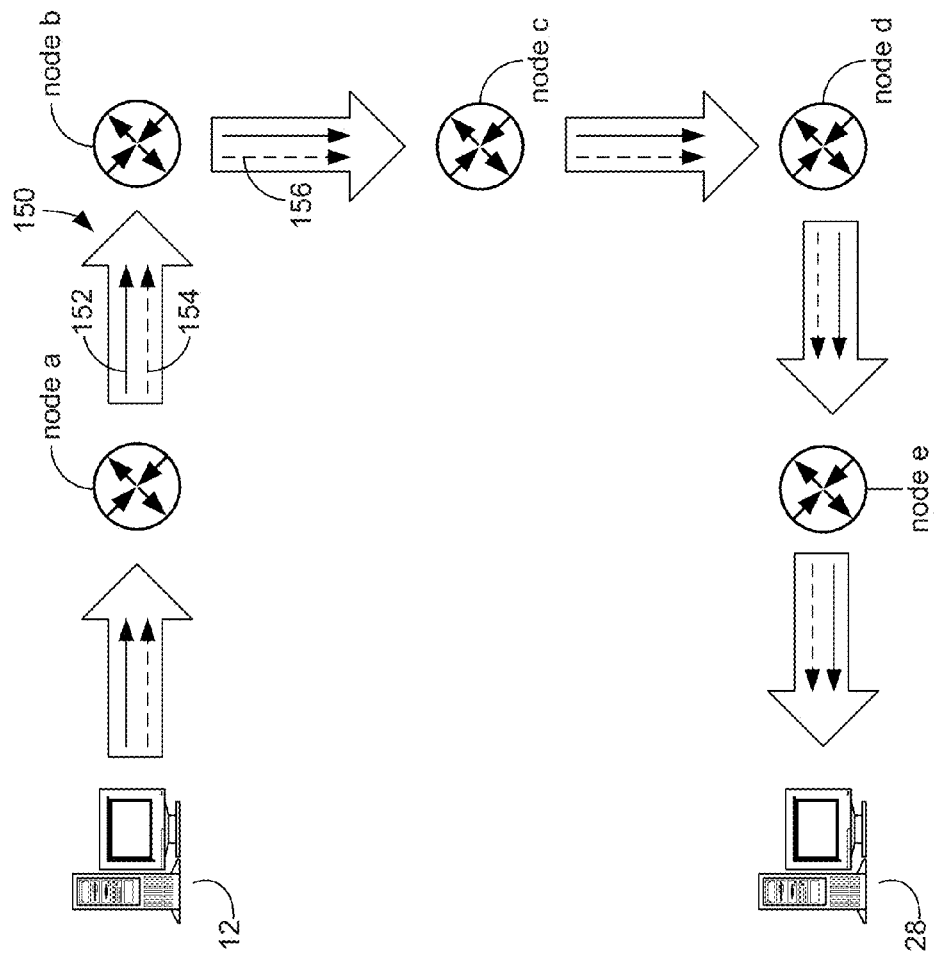
FIG. 3 diagrammatically depicts an implementation of the quality of experience process according to an example embodiment of the present disclosure.

Consistent with the foregoing, quality of experience process 10 determine 100 a first quality of experience metric associated with a media stream at a first network node. For example, as shown in FIG. 3, video stream 150 may pass through node a. Quality of experience process 10 may determine a first quality of experience metric associated with video stream 150 at node a. The quality of experience metric may be based upon, at least in part, network conditions experienced by the media stream (e.g., video steam 150) associated with the first node (e.g., node a). For example, the network conditions may include, but are not limited to, latency, packet loss, jitter, burst ratio, etc., in the network link between server computer 12 and node a. In an embodiment, node a may measure the relevant network conditions existing between server computer 12 and node a (e.g., which may define the network path, or link of video stream 150 between server computer 12 and node a). Quality of experience process 10 may determine 100 a quality of experience metric based upon, at least in part, the measured network conditions. The quality of experience metric may be a metric that defined the expected impact that the measured network conditions will have on the quality of experience associated with video stream 150. For example, assuming a set level of quality of experience for video stream 150 as transmitted by server computer 12, the network conditions experienced by video stream 150 as it travels through the network may adversely impact the resultant perceived quality of experience by an end consumer. For example, a congested network may result in a decrease in the quality of experience of video stream 150 as a result of lost packets, or excessive latency, etc. The determined 100 first quality of experience metric may be a relative indicator of the expected impact on the quality of experience of video stream 150 as a result of having experienced the measured network conditions during transit between server computer 12 and node a.

Quality of experience process 10 may also transmit 102 the first quality of experience metric with the media stream. For example, as shown, video stream 150 may be transmitted including media data 152 (such as video data, audio data, subtitle data, etc.) and including quality of experience metric data (e.g., including first quality of experience metric 154), which may be transmitted together. Accordingly, first quality of experience metric 154 may be forwarded along with media data 152 to the next node (e.g., node b) in the network path between server computer 12 and end point client electronic device 28 as part of video stream 150.

With continued reference to FIG. 3, quality of experience process 10 may also determine 104 a second quality of experience metric associated with the media stream at a second network node. For example, as shown video stream 150 may be forwarded through node b. In a generally similar manner as described with respect to node a, node b may determine 104 a second quality of experience metric for video stream 150. The second quality of experience metric may be based upon, at least in part, the relevant network conditions for video stream 150, e.g., for the network link between node a and node b. For example, in a generally similar manner, the network conditions (e.g., latency, packet loss, jitter, burst ratio, etc.) existing between node a and node b may impact the quality of experience for video stream 150. Quality of experience process 10 may determine 104 a second quality of experience metric for video steam 150 that may be indicative of an expected impact of the measured network conditions on the quality of experience for video stream 150.

Quality of experience process 10 may further transmit 106 an updated quality of experience metric with the media stream. For example, updated quality of experience metric 156 may be transmitted along with media data 152 with video stream 150, e.g. to the next node in the network path for video stream 150 between server computer 12 and end point 28. The updated quality of experience metric (e.g., updated quality of experience metric 156) may be based upon, at least in part, first quality of experience metric 154 and the second quality of experience metric. For example, in an embodiment, the second quality of experience metric may be added to first quality of experience metric 154 to provide updated quality of experience metric 156. In such an embodiment, updated quality of experience metric may include information regarding both the first quality of experience metric and information regarding the second quality of experience metric. In an embodiment, each of the first and the second quality of experience metric may include information regarding each respective node, such as IP address of each node, the location of each node, the device type of each node, as well as other possible node information. In such an embodiment, updated quality of experience metric may include information regarding the network path for video stream 150, as well as network conditions (e.g., via the first and second quality of experience metrics) for each network link.

Further, one or more additional nodes (e.g., node c, node d, node e) may each also measure network conditions associated with the network link between each respective node and the preceding node in the network path for video stream 150. A respective quality of experience metric may be determined based on the measured network conditions associated with each node. Further, quality of experience process 10 may transmit incrementally updated quality of experience metrics with video stream 150. Each incrementally updated quality of experience metric may be based upon, at least in part, the quality of experience metric determined at each respective node, and the quality of experience metric received from the prior node (e.g., which may itself be based upon, at least in part, quality of experience metrics determined at further upstream nodes). Consistent with such an embodiment, at any point along the path of video stream 150, a monitoring node may have access to the end-to-end values of the quality of experience metric determined by each previous node. This information may, for example, allow quality of experience process 10, and/or another process (such as media distribution application 48, or another application or process) to identify the location and/or network link that may be giving rise to a decrease in the quality of experience for video stream 150. Additionally, the updated quality of experience metric may allow changes in the quality of experience metric across the network to be determined.

In some embodiments, the quality of experience metric (e.g., first quality of experience metric 154, updated quality of experience metric 156, and/or an updated quality of experience metric determined at another network node) may allow real-time corrective actions to be taken with regard to video stream 150, e.g., to compensate for decreases in the quality of experience for video stream 150. For example, quality of experience process 10 may determine 108 that one of the first quality of experience metric and the second quality of experience metric may be associated with an unsatisfactory quality of experience for the media stream. For example, assume that the quality of experience metric may be represented by a numerical value of between 1 and 10, with 10 indicating the highest quality of experience and 1 being the lowest quality of experience. A threshold quality of experience metric value of 6 may be defined, such that a quality of experience metric value less than 6 may indicate an unsatisfactory quality of experience for video stream. For example, an unsatisfactory quality experience metric may indicate that quality of experience that would be perceived by an end user may be consider unsatisfactory, e.g., giving rise to complaints by the end user, or the end user otherwise being dissatisfied. The unsatisfactory quality of experience may be based upon, at least in part, a single determined quality of experience metric that is less than the threshold quality of experience metric, and/or a combined aggregate quality of experience metric. For example, via each of a plurality of network links, the quality of experience may be degraded (e.g., as a result of packet loss, relatively high latency, etc.), such that by time video stream 150 reaches the end point (e.g., client electronic device 28), the quality of experience for video stream 150 would be considered to be unsatisfactory to an end user.

In an embodiment, quality of experience process 10 may implement 110 a remedial action with respect to the media stream. The remedial action may, for example, be implemented to increase the perceived quality of experience for video stream 150, e.g., to elevate the quality of experience for video stream 150 to a satisfactory level. In an embodiment, implementing 110 the remedial action may include implementing the remedial action via a specific node associated with the unsatisfactory quality of experience for the media stream. For example, the quality of experience metrics for the media stream may provide a location awareness and an awareness of upstream and downstream network conditions, relative to one or more nodes, along the path of the media stream through the network. Accordingly, in some embodiments, remedial actions may be implemented with respect to specific nodes, e.g., which may provide a desired result relative to an effected network link, rather than to the media stream as a whole. For example, and as will be discussed in greater detail below, in some cases, when only one link between two nodes that are on the path of the media stream is congested, remedial action may be implemented 110 with respect to the specific link (e.g., via either node associated with respective ends of the link). For example, the buffer size on the node nearest to the end point may be increased, or duplicated packets may be transmitted only on the affected link. Thus the travel time on other links of the path may not be affected, thereby lowering the traffic load across other links, non-affected links.

Figure 4:
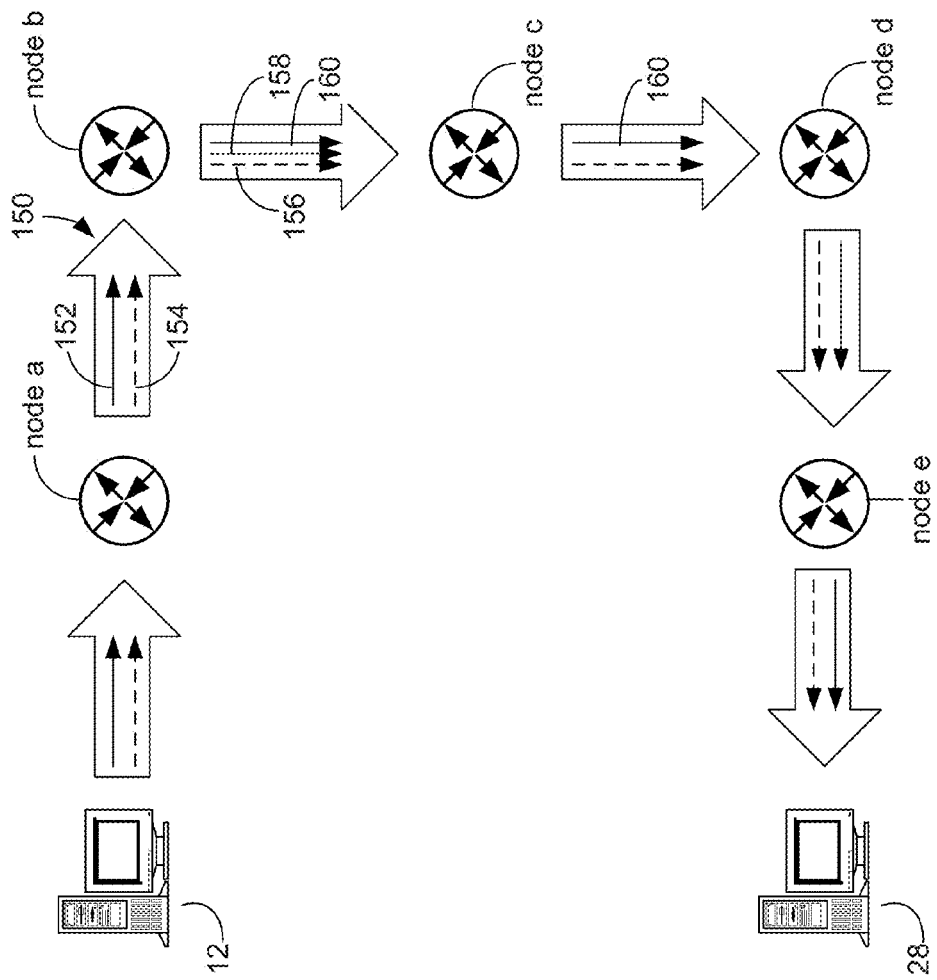
FIG. 4 diagrammatically depicts an implementation of the quality of experience process according to an example embodiment of the present disclosure.

The remedial action may include reducing 112 a bandwidth requirement of the media. For example, and referring to also to FIG. 4, in a situation in which network congestion is detected between node a and node c, quality of experience process 10 may determine 108 a quality of experience metric (for example, updated quality of experience metric 156) may be associated with an unsatisfactory quality of experience for video stream 150. According to such an example, quality of service process 10 may implement 110 a remedial action including reducing 112 a bandwidth requirement for video stream 150. For example, quality of experience process 10 may enable real time (or near real time) in network media quality adaption for multicast (or unicast) media streams. In one such implementation, one or more nodes (e.g., node b) in the media distribution network may be capable of dynamically stripping elements from the media steam (e.g., which may include a video stream, in the case of an IPTV network, or other streaming video network) before forwarding a reduced quality variant of the media stream to the next, downstream, node in the network. For example, as shown, the superfluous packets associated with the elements stripped from media data stream 152 may be moved to redundant stream 158. Moving the superfluous packets to redundant stream 158 may produce reduced bandwidth media data stream 160.

In an embodiment, the packets to be removed from video stream 150 may be moved into redundant stream 158, e.g., by marking the packets to be removed with a "drop flag." In an example embodiment, redundant stream 158 may be dropped from video stream 150, e.g., at node c. Accordingly, downstream from node c video stream 150 may include reduced bandwidth media data 160 (e.g., which may include media data 152 having redundant stream 158 data removed) and quality of experience metric data 156. Accordingly, while the video quality of video stream may be reduced (e.g., from a 1080 resolution to a 720 resolution), the quality of experience associated with video stream 150 may be improved, e.g., through the removal of artifacts, noise, pixilation, frozen or lost frames, etc., from the playback of the video. Accordingly, perceived user quality of experience may be increased.

Figure 5:
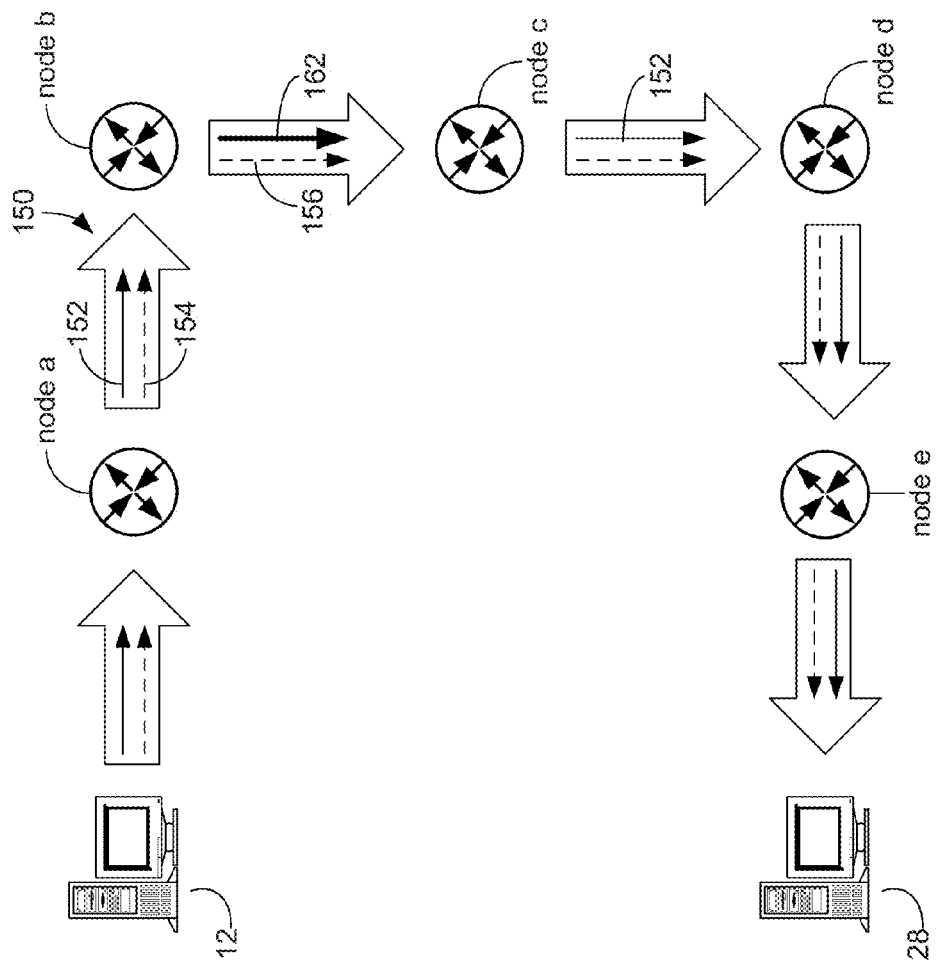
FIG. 5 diagrammatically depicts an implementation of the quality of experience process according to an example embodiment of the present disclosure.

In an example embodiment, the remedial action may include transmitting 114 redundant media stream data. For example, and referring also to FIG. 5, the quality of experience metrics for the video stream may be logged on a plurality of nodes on the path of the media stream through the network (e.g., which could include logging quality of experience metrics for every node on the path), and may provide an awareness of the location of each node and the upstream and downstream network characteristics. Based upon, at least in part, a determined quality of experience metric (e.g., updated quality of experience metric 156) by node c, quality of experience process 10 may identify a network link (e.g., a network link between node b and node c) suffering from a relatively high packet loss rate. The relatively high packet loss rate for the network link between node b and node c may be giving rise to an unsatisfactory quality of experience (e.g., as may be indicated by updated quality of experience metric 156). In an embodiment, quality of experience process 10 may implement 110 a remedial action to compensate for the relatively high packet loss rate including transmitting 114 redundant media stream data. For example, based upon, at least in part, a knowledge of the location of the link suffering from relatively high packet loss rate, quality of experience process 10 may transmit 114 redundant media stream data from the node upstream from the affected link (e.g., from node b). For example, each packet of media stream data 152 may be transmitted twice from node b to provide augmented media stream data 162. Transmitting each packet of media stream data 152 twice may, at least in part, mitigate the effects of the relatively high packet loss rate.

Consistent with the foregoing example, quality of experience process 10 may have an awareness (e.g., based upon, at least in part, quality of experience metrics determined by each node along the network path of video stream 150) of the affected link. Accordingly, the remedial action may be implemented 110 with respect to the affected node or nodes. For example, the duplicate packets may be transmitted by a network node preceding the impacted network link (e.g., node b), and may be dropped from the transmission at a node following the impacted network link (e.g., node c). As shown, video stream 150 transmitted from node c may include original media stream data 152, e.g., not including the redundant packets. As such, only a portion of the transmission path may carry duplicate packets, and therefore the entirety of the network path for the media stream may not be required to carry the additional traffic of the duplicate packets. Rather, in such an embodiment, only the portion of the network path experiencing relatively high packet loss may carry the additional traffic of the duplicate packets, which serve the purpose of reducing quality of experience decreases due to lost packets.

Various additional and/or alternative remedial actions may be implemented. For example, the quality of experience issue (e.g., an unsatisfactory quality of experience) may be reported to a management system, e.g., by reporting back up the network path to one or more upstream nodes (e.g., relative to the node at which the determination of the quality of experience is made), re-routing of packets associated with the media stream to improve the quality of experience (e.g., in which a decrease in quality of experience is associated with one or the nodes along the network path), or the like. In an example of such an implementation, data concerning media stream discontinuities, detailed frame analysis measurements, unwatchable seconds of streaming media, etc., may be collected and monitored. Such data may be logged for troubleshooting purposes. In some embodiments, the collected and monitored data may be continuously and/or periodically pushed back to the video service provider, e.g., for customer experience management. In some embodiments, the collected and monitored data may also allow a system operator (e.g., an internet protocol TV operator) to determine the existence and degree of any bottlenecks or problems in the media distribution network. Further, the collection and monitoring of such data may enable a media distribution operator to validate Service Level Agreements (SLA's) with third party network operators whose networks are being used to host or transport the media to end users.

Quality of experience process 10 may further determine 116 that a satisfactory quality of experience for the media stream has been restored. For example, quality of experience process may continuously (and/or intermittently) determine quality of experience metrics associated with a plurality of nodes along the network path of video stream 150. Accordingly, in the event that the network condition giving rise to the unsatisfactory quality of experience (e.g., a congested network, a network suffering from a relatively high packet loss rate, or other network condition) is remedied, quality of experience process 10 may determine that a satisfactory quality of experience for video stream 150 has been restored (e.g., based upon, at least in part, one or more quality of experience metrics determined by the nodes). In response to determining 116 that a satisfactory quality of experience for video stream 150 has been restored, quality of experience process 10 may discontinue 118 the remedial action. For example, in a situation in which the remedial action includes providing a reduced bandwidth video stream, video stream 150 may be transmitted at the original bandwidth (for example, without stripping out any media packets). Similarly, in a situation in which a remedial action included transmitting redundant packets, the transmission of such redundant packets may be discontinued. Other remedial actions may be similarly discontinued 118.

Consistent with various embodiments, in some situations logic may be provided to modify a media stream, and the logic may be deployed in the network (e.g., at node a, node b, node c, etc.), for example by deploying instantiations of quality of experience process 10, and/or functionality of quality of experience process 10, at one or more of network transmission nodes (e.g., one or more of node a, node b, node c, node d, and node e, in the illustrated examples). In such an implementation communication with the video server may not be required to adapt the quality of the video transmitted to downstream nodes. Accordingly, the amount of signaling overhead may be reduced (e.g., as nodes in the network may only need to communicate with an upstream node) which still achieving adaptive media quality transmission for improving end user quality of experience.

Consistent with various implementations, quality of experience metrics transmitted along with media stream may enable real-time quality assessment of the media at a plurality of nodes along the network transmission path of the media stream. In some embodiments, an overview map of the media streaming conditions may be known based upon, at least in part, the quality of experience metrics determined at the plurality of nodes. This location awareness of streaming conditions may make it possible to take actions faster at server side while the whole network streaming condition is monitored. In some embodiments, remedial actions may be made in real-time according to the quality of experience metrics changes. For example, in a situation in which the network is congested the media quality bit rate (e.g., video quality bit rate for video media) can be reduced. In such a situation, it may be possible to guarantee a quality of service with a reduction in video quality (e.g., while eliminating artifacts that may otherwise arise if the higher bit rate is maintained). Additionally, in some embodiments remedial actions can be specified to links, or nodes, rather than streams as a whole. For example, in a case in which only one link between two nodes that are on the path of the stream are congested, only the buffer size on the node nearest to the user side needs to be increased, or in other way, only transmit duplicated packets on this link, in order to maintain a satisfactory quality of experience. Thus, the travel time on other links of the path may not be affected, and a lower traffic load may be maintained on other links.

Figure 6:
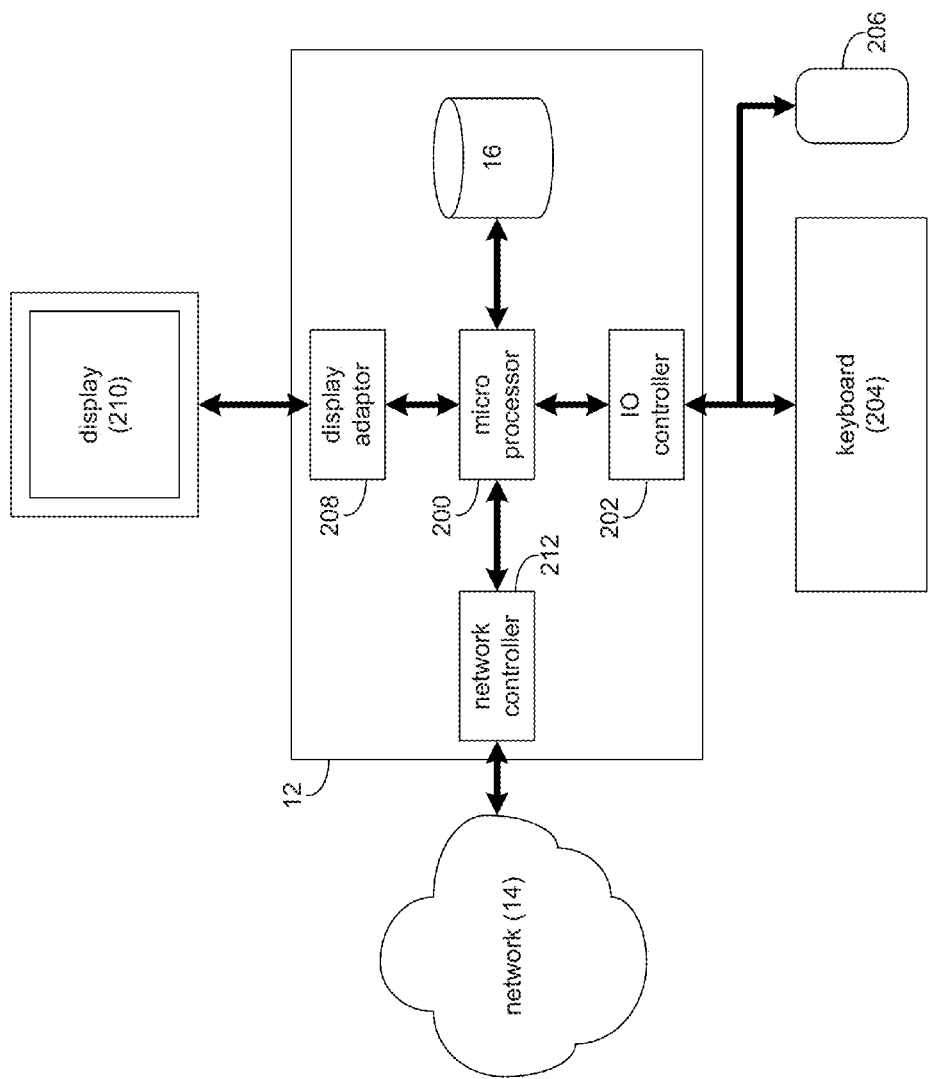
FIG. 6 is a diagrammatic view of the computing device of FIG. 1, according to an implementation of the present disclosure.

Referring also to FIG. 6, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, quality of experience process 10 may be substituted for computing device 12 within FIG. 6, examples of which may include but are not limited to client electronic devices 28, 30, 32, 34.

Computing system 12 may include microprocessor 200 configured to e.g., process data and execute instructions/code for quality of experience process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, C#.NET, PHP, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 200) of a general purpose computer/special purpose computer/other programmable data processing apparatus (e.g., computing device 12), such that the instructions, which execute via the processor (e.g., processor 200) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer program product comprising a non-transitory computer readable storage medium having a plurality of instructions stored thereon, which, when executed by a processor, cause the processor to perform operations including:
    determining a first quality of experience metric associated with a media stream at a first network node;
    transmitting the first quality of experience metric with the media stream to a second network node;
    determining a second quality of experience metric associated with the media stream at the second network node;
    determining that one of the first quality of experience metric and the second quality of experience metric is associated with an unsatisfactory quality of experience for the media stream, wherein the unsatisfactory quality of experience for the media stream includes, at least in part, a degraded quality of the media stream;
    implementing a remedial action with respect to the media stream, wherein the remedial action includes re-routing of packets associated with the media stream to improve a quality of experience for the media stream; and
    transmitting an updated quality of experience metric with the media stream to a third network node, the updated quality of experience metric including, at least in part, the first quality of experience metric associated with the media stream at the first network node and the second quality of experience metric associated with the media stream at the second network node.

2. The computer program product of claim 1, wherein the quality of experience metric is based upon, at least in part, network conditions experienced by the media stream associated with the first network node.

3. The computer program product of claim 1, wherein the remedial action further includes reducing a bandwidth requirement of the media.

4. The computer program product of claim 1, wherein the remedial action further includes transmitting redundant media stream data.

5. The computer program product of claim 1, wherein implementing the remedial action includes implementing the remedial action via a specific node associated with the unsatisfactory quality of experience for the media stream.

6. The computer program product of claim 1, further including instructions for:
    determining that a satisfactory quality of experience for the media stream has been restored, and
    discontinuing the remedial action.

7. A computing system comprising:
    a processor and a memory architecture coupled with the processor, the processor configured for:
    determining a first quality of experience metric associated with a media stream at a first network node;
    transmitting the first quality of experience metric with the media stream to a second network node;
    determining a second quality of experience metric associated with the media stream at the second network node;
    determining that one of the first quality of experience metric and the second quality of experience metric is associated with an unsatisfactory quality of experience for the media stream, wherein the unsatisfactory quality of experience for the media stream includes, at least in part, a degraded quality of the media stream;
    implementing a remedial action with respect to the media stream, wherein the remedial action includes re-routing of packets associated with the media stream to improve a quality of experience for the media stream; and
    transmitting an updated quality of experience metric with the media stream to a third network node, the updated quality of experience metric including, at least in part, the first quality of experience metric associated with the media stream at the first network node and the second quality of experience metric associated with the media stream at the second network node.

8. The computing system of claim 7, wherein the quality of experience metric is based upon, at least in part, network conditions experienced by the media stream associated with the first network node.

9. The computing system of claim 7, wherein the remedial action further includes reducing a bandwidth requirement of the media.

10. The computing system of claim 7, wherein the remedial action further includes transmitting redundant media stream data.

11. The computing system claim 7, wherein implementing the remedial action includes implementing the remedial action via a specific node associated with the unsatisfactory quality of experience for the media stream.

* * * * *